United States Patent
Reitz

(10) Patent No.: US 9,377,985 B2
(45) Date of Patent: Jun. 28, 2016

(54) METHOD AND APPARATUS FOR UTILIZING PERSONAL COMPUTING RESOURCES FOR MOBILE PRINT CONVERSION AND ROUTING

(71) Applicant: Xerox Corporation, Norwalk, CT (US)

(72) Inventor: Jeremy L. Reitz, Marion, NY (US)

(73) Assignee: Xerox Corporation, Norwalk, CT (US)

( * ) Notice: Subject to any disclaimer, the term of this patent is extended or adjusted under 35 U.S.C. 154(b) by 107 days.

(21) Appl. No.: 13/835,461

(22) Filed: Mar. 15, 2013

(65) Prior Publication Data

US 2014/0268215 A1 Sep. 18, 2014

(51) Int. Cl.
G06F 3/12 (2006.01)

(52) U.S. Cl.
CPC .............. *G06F 3/1292* (2013.01); *G06F 3/126* (2013.01); *G06F 3/1212* (2013.01); *G06F 3/1285* (2013.01); *G06F 3/1288* (2013.01); *G06F 3/1247* (2013.01)

(58) Field of Classification Search
CPC ...... G06F 3/121; G06F 3/1288; G06F 3/1234
USPC ....................................................... 358/1.15
See application file for complete search history.

(56) References Cited

U.S. PATENT DOCUMENTS

| | | | | |
|---|---|---|---|---|
| 7,743,120 B2* | 6/2010 | Takagi | ........................ | 709/221 |
| 2002/0026343 A1* | 2/2002 | Duenke | ............................ | 705/8 |
| 2004/0207867 A1* | 10/2004 | Stringham | .................... | 358/1.15 |
| 2005/0028173 A1* | 2/2005 | Aiba | ............................ | 719/327 |
| 2005/0275884 A1* | 12/2005 | Matsukubo et al. | ......... | 358/1.15 |
| 2006/0265644 A1* | 11/2006 | Koizumi | ....................... | 715/522 |
| 2011/0269436 A1* | 11/2011 | Porco | ......................... | 455/414.1 |
| 2012/0105908 A1* | 5/2012 | Tsutsumi | ..................... | 358/1.15 |
| 2013/0139148 A1* | 5/2013 | Berg | ..................... | H04J 3/0667 717/177 |

* cited by examiner

*Primary Examiner* — John Wallace

(57) ABSTRACT

A method, non-transitory computer readable medium, and apparatus for mobile print conversion and routing are disclosed. For example, the method receives at a mobile print server a print job request from a mobile endpoint device, determines at the mobile print server that a personal computing resource is available to convert the print job request, determines at the mobile print server to send the print job request to the personal computing resource and sends by the mobile print server the print job request to the personal computing resource for conversion of a document in the print job request that is to be printed.

15 Claims, 4 Drawing Sheets

METHOD AND APPARATUS FOR UTILIZING PERSONAL COMPUTING RESOURCES FOR MOBILE PRINT CONVERSION AND ROUTING

The present disclosure relates generally to print conversion and routing and, more particularly, to a method and an apparatus for utilizing personal computing resources for mobile print conversion and routing.

BACKGROUND

One of the limitations introduced with mobile endpoint devices is the lack of a print subsystem. Many print vendors have compensated by introducing a cloud infrastructure for server based conversion and routing. While this architecture does work, it does not scale well in a global environment since the server becomes a bottleneck for document conversion. For example, during periods of high volume of print requests the processing availability of the servers can become a bottleneck.

In addition, the servers may be located thousands of miles away from the mobile endpoint device or printer that the mobile endpoint device is trying to print to. This leads to an increase in latency to spool the document due to the geographic distance introduced between the centralized conversion bank and the destination printer.

SUMMARY

According to aspects illustrated herein, there are provided a method, a non-transitory computer readable medium, and an apparatus for mobile print conversion and routing. One disclosed feature of the embodiments is a method that receives at a mobile print server a print job request from a mobile endpoint device, determines at the mobile print server that a personal computing resource is available to convert the print job request, determines at the mobile print server to send the print job request to the personal computing resource and sends by the mobile print server the print job request to the personal computing resource for conversion of a document in the print job request that is to be printed.

Another disclosed feature of the embodiments is a non-transitory computer-readable medium having stored thereon a plurality of instructions, the plurality of instructions including instructions which, when executed by a processor, cause the processor to perform a method that receives at a mobile print server a print job request from a mobile endpoint device, determines at the mobile print server that a personal computing resource is available to convert the print job request, determines at the mobile print server to send the print job request to the personal computing resource and sends by the mobile print server the print job request to the personal computing resource for conversion of a document in the print job request that is to be printed.

Another disclosed feature of the embodiments is an apparatus comprising a processor that is configured to receive at a mobile print server a print job request from a mobile endpoint device, determine at the mobile print server that a personal computing resource is available to convert the print job request, determine at the mobile print server to send the print job request to the personal computing resource and send by the mobile print server the print job request to the personal computing resource for conversion of a document in the print job request that is to be printed.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer readable medium for using a personal computing resource for mobile print conversion and routing. As discussed above, one of the limitations introduced with mobile endpoint devices is the lack of a print subsystem. Many print vendors have compensated by introducing a cloud infrastructure for server based conversion and routing. However, the cloud infrastructure with servers have drawbacks, such as for example, the server can become a bottleneck for processing, latency depending on the location of the servers, scalability due to the costs of additional servers, and the like.

One embodiment of the present disclosure uses personal computing resources to perform the conversion for print job requests. Typically, most users have more than one computing device. The computing devices that are not being used by the user may sit idle. As a result, a large amount of processing power may sit idle without being used. However, if the idle computing devices can communicate over a wired or wireless network, some of the processing required by the servers used for processing mobile print job requests can be offloaded to personal computing resources that may be sitting idle.

Figure 1:
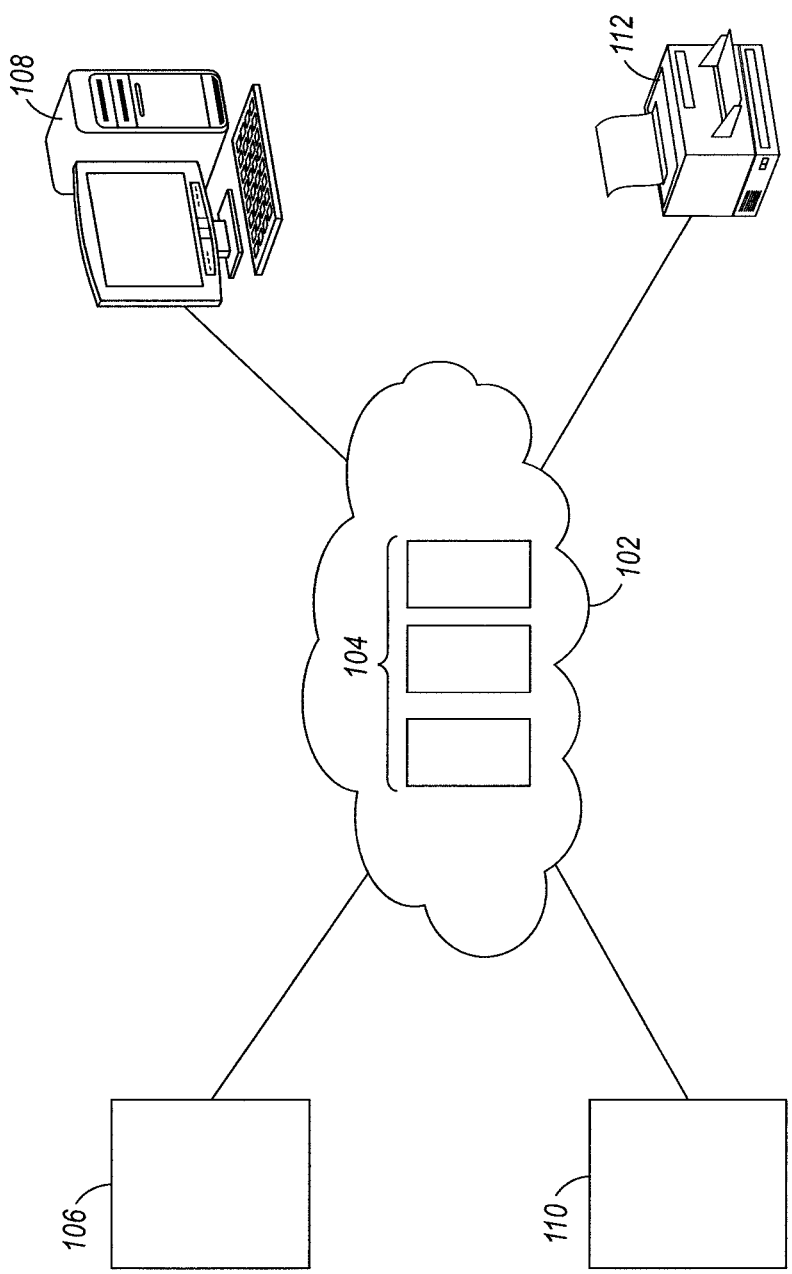
FIG. 1 illustrates one example of a communication network of the present disclosure.

To better understand the present disclosure, FIG. 1 illustrates an example of a communication network 100. In one embodiment, the communication network 100 may include a packet network such as an Internet Protocol (IP) network 102. The IP network 102 may be, for example, the Internet, a service provider network, an access network, a core network, a local area network, and the like.

In one embodiment, the IP network 102 may include one or more mobile print servers 104. In one embodiment, the mobile print servers 104 may perform mobile print conversion and routing. For example, the mobile print servers 104 may receive a print job request and convert a document associated with the print job requested into a proper format for printing and route the converted document in the print job request to the appropriate printer to be printed.

In one embodiment, the mobile print servers may include a database or memory for queuing print job requests, storing software protocols, storing one more printers and printer locations, and the like. In one embodiment, the mobile print servers may be embodied as a general computing device as described below and illustrated in FIG. 4.

Although the one or more mobile print servers 104 are located in the IP network 102, it should be noted that the one or more mobile print servers 104 may be located outside of the IP network 102. Although the one or more mobile print servers 104 are illustrated in FIG. 1 as being near one another, it should be noted that the mobile printer servers 104 may be distributed in different geographical locations.

In one embodiment, a mobile endpoint device 106 may be in communication with the one or more mobile print servers 104 via the IP network 102. The mobile endpoint devices 106 may communicate with the IP network 102 via a wired or wireless connection. Although only a single mobile endpoint device 106 is illustrated, it should be noted that any number of mobile endpoint devices may be deployed. In one embodiment, the mobile endpoint device 106 may be a laptop computer, a mobile endpoint device, a smart phone, a tablet computer, a netbook computer, and the like. In one embodiment, the mobile endpoint device may be embodied as a general computing device discussed below and illustrated in FIG. 4.

In one embodiment, the mobile endpoint device 106 may send a print job request to the one or more mobile print servers 104 to print a document. In one embodiment, a document may be defined broadly as any data or electronic file that a user would like to print, for example, a web page(s), a word processing page(s), an image, a graphic, a spreadsheet page(s), a screenshot, and the like.

In one embodiment, the mobile endpoint device 106 may include in the print job request to print on a printing device 112. Although only a single printing device 112 is illustrated in FIG. 1, it should be noted that any number of printing devices may be deployed. In one embodiment, the printing device 112 may be any device capable of printing and communicating with the IP network 102 via a wired or wireless connection. For example, the printing device 112 may be a inkjet printer, a laser printer, a networked copying/fax/printing machine, a multi-function device, and the like.

Currently, the print job request would be sent to the one or more mobile print servers 104 and the one or more mobile print servers 104 would place the print job request in a queue, eventually perform conversion of the print job request and then route the print job request to the printer 112. However, as discussed above, the user may have one or more personal computing resources 108 and 110 that may be sitting idle as the user is using the mobile endpoint device 106. For example, the user may have a desktop computer 108 at his or her office and a tablet computer 110 at his or her home. Although a desktop computer 108 and the tablet computer 110 are used as example personal computing resources, it should be noted that a personal computing resource may include any computing device, such as for example, a laptop computer, a netbook computer, a desktop computer, a ultrabook computer, a tablet computer, a smart phone, and the like. In one embodiment, a "personal" computing device may be defined as any computing device that the user may own, be assigned to or have access to remotely. For example, the personal computing device may be a user's own desktop at his or her home or an office computer that the user may access via his or her log-in or authentication credentials.

In one embodiment, the personal computing devices 108 and 110 may be embodied as a general computing device as described below and illustrated in FIG. 4. Although two personal computing devices 108 and 110 are illustrated in FIG. 1, it should be noted that any number (more or less) of personal computing devices may be deployed.

In one embodiment, the user may be traveling and using the mobile endpoint device 106 to find and print documents. As a result, the personal computing resources 108 and 110 may be sitting idle while the user is away. In one embodiment, a co-worker may ask that the user of the mobile endpoint device 106 print a copy of a document to the printing device 112 that is in the office and near the co-worker. The user's work computer 108 may also be in the office and near the printing device 112. The user may send a print job request from the mobile endpoint device 106 to the user's work computer 108 to be converted and sent to the printing device 112 to be printed. Thus, a more efficient processing of the print job request may be provided compared to sending the print job request to the mobile print servers 104 that may be located thousands of miles away from the mobile endpoint device 106 and the printing device 112.

In one embodiment of the present disclosure, if one of the mobile print servers 104 determines that personal computing resource 108 is registered and available to perform the conversion of the print job request and that it would be more efficient in terms of latency (e.g., distance) and/or processing availability to send the print job request to the personal computing resource 108, then the mobile print server 104 may forward the print job request to the personal computing resource 108 for processing (e.g., conversion of the document in the print job request and routing the converted document of the print job request to the printing device 112). As a result, processing power in the one or more print servers 104 may be preserved, processing power of the personal computing resource that would otherwise sit idly may be utilized and the print job request may be processed faster due to the proximity of the personal computing resource 108 near the printing device 112 and/or the mobile endpoint device 106 relative to the one or more print servers 104. The details of registering the one or more personal computing resources 108 and 110 and determining whether the print job request is forwarded to the one or more personal computing resources 108 and 110 is discussed in further detail below in conjunction with FIGS. 2 and 3.

It should be noted that the communication network 100 has been simplified. For example, the network 100 may include other network elements such as border elements, routers, switches, policy servers, security devices, firewalls, a content distribution network (CDN), and the like. In addition, the communication network 100 may include additional networks between the IP network 102 and the mobile endpoint device 106, personal computing resources 108 and 110 and the printing device 112, such as different access networks.

Figure 2:
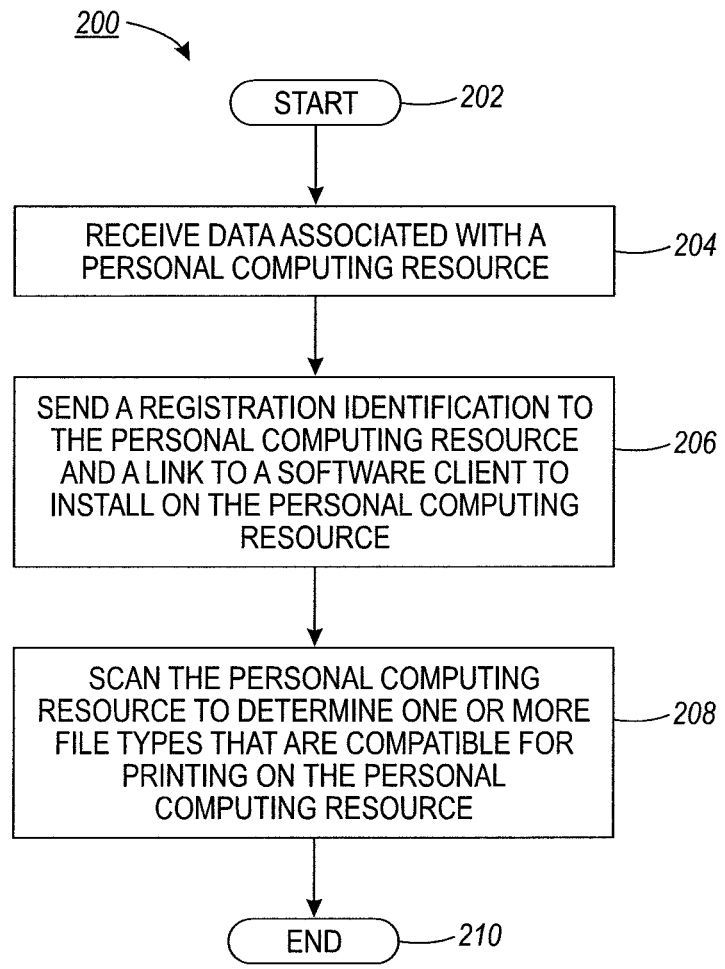
FIG. 2 illustrates an example flowchart of one embodiment of a method for registering one or more personal computing resources with a mobile print server.

FIG. 2 illustrates a flowchart of a method 200 for registering one or more personal computing resources with a mobile print server. In one embodiment, the method 200 may be performed by one of the mobile print servers 104 or a general-purpose computer as illustrated in FIG. 4 and discussed below.

The method 200 begins at step 202. At step 204, the method 200 may receive data associated with a personal computing resource. In one embodiment, a user may log into a mobile print extensible interface platform (EIP), web portal or a mobile application to input various information about one or more personal computing resources. In one embodiment, the data may include any type of information that may help the mobile print servers 104 to identify and communicate with the personal computing resource. For example, the data may include a machine name, an address of the personal computing resource (e.g., a media access control (MAC) address, an IP address, domain name, extension, specific port information, and the like), a global positioning system (GPS) location information, a time of operation (e.g., when the personal computing resources is typically operating, turned on or connected to the communication network), and the like.

At step 206, the method 200 sends a registration identification to the personal computing resource and a link to a software client to install on the personal computing resource.

For example, the registration identification (e.g., a username and password) may be used to authorize the personal computing resource to be accessed by the mobile print servers 104 when a print job request is sent by a mobile endpoint device of the user. In one embodiment, the software client may be installed on the personal computing resource such that it is configured to establish a communication path with the mobile print servers 104 and process the print job requests forwarded over the communications path by the mobile print servers.

At step 208, the method 200 scans the personal computing resource to determine one or more file types that are compatible for printing on the personal computing resource. For example, after the software client is installed on the personal computing resource, a communication session may be established between one of the mobile print servers and the personal computing resource. The mobile print sever may then scan the personal computing resource to determine what file types are supported for conversion by the personal computing resource. For example, the personal computing resource may support certain word processing program file types and certain database program file types. However, if a spreadsheet document file type were sent to the personal computing resource, the personal computing resource would not be able to perform conversion on the print job request because the personal computing resource does not support spreadsheet file types. The results of the scan may be stored at the mobile print server and referenced at a later time when determining whether a print job request should be forwarded to a personal computing resource, as discussed below with reference to FIG. 3.

In one embodiment, the method 200 may be repeated if the user is registering more than one personal computing resource with the mobile print servers. In one embodiment, if the user registers more than one personal computing resource the user may set one of the personal computing resources as a preferred or default personal computing resource in a user profile. The method 200 ends at step 210.

Figure 3:
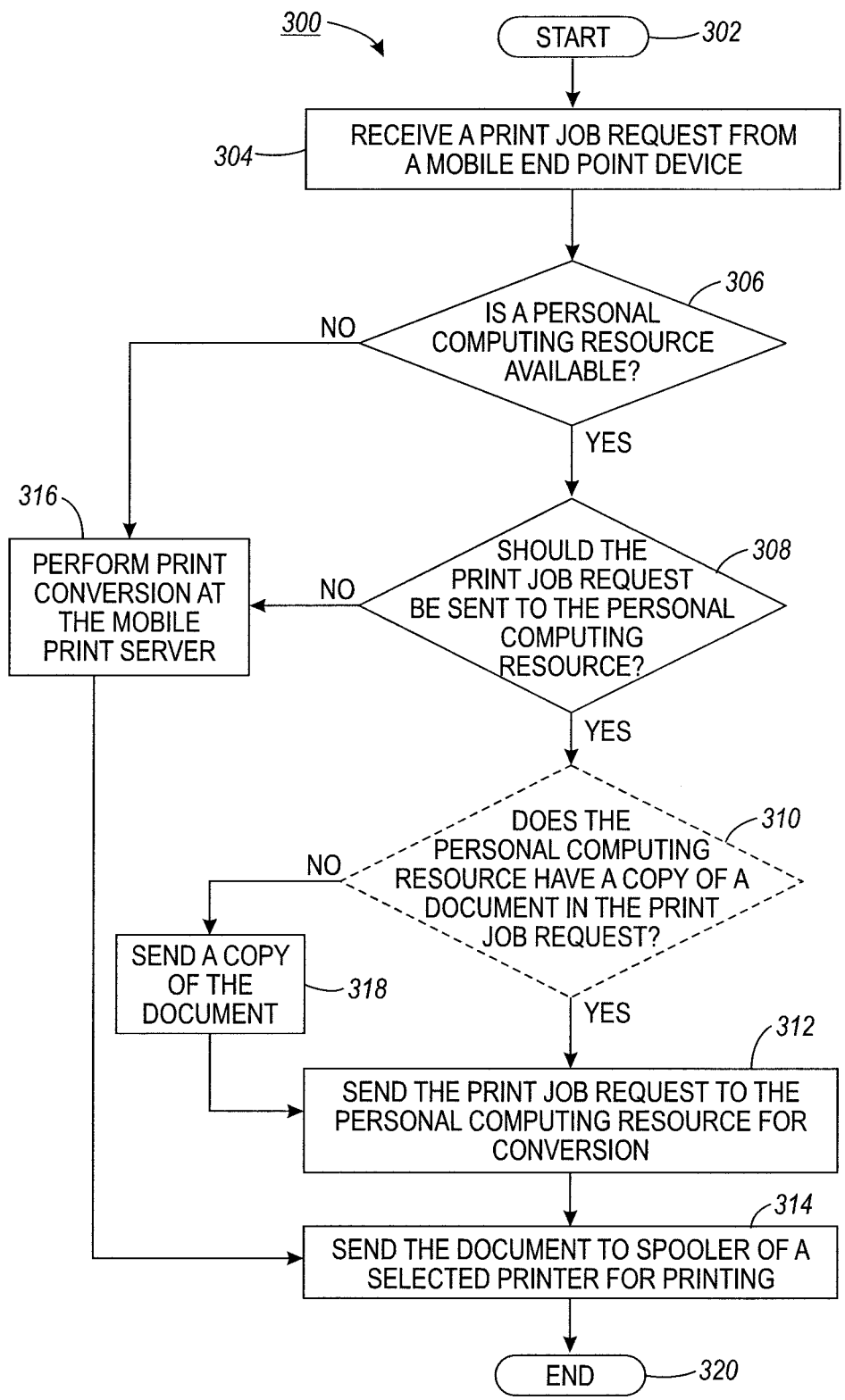
FIG. 3 illustrates an example flowchart of one embodiment of a method for using a personal computing resource mobile print conversion and routing.

FIG. 3 illustrates a flowchart of a method 300 for using a personal computing resource for mobile print conversion and routing. In one embodiment, the method 300 may be performed by one of the mobile print servers 104 or a general-purpose computer as illustrated in FIG. 4 and discussed below.

The method 300 begins at step 302. At step 304, the method 300 may receive a print job request from a mobile endpoint device. In one embodiment, the print job request may be received by one of the mobile print servers to print a document. For example, a document may be defined broadly as any data or electronic file that a user would like to print, for example, a web page(s), a word processing page(s), an image, a graphic, a spreadsheet page(s), a screenshot, and the like. In one embodiment, the print job request may include a specified printer or printing device.

At step 306, the method 300 determines if a personal computing resource is available. For example, the mobile print server may check to see if a personal computing resource is registered for the user (as described above in method 200 and FIG. 2), whether the personal computing resource is turned on and able to communicate with the mobile print server, whether the personal computing resources supports a file type of the document associated with the print job request, or any combination thereof. It should be noted that any one or more of the checks may be performed to determine if the personal computing resource is available. In other words, in one embodiment, it is not required that all of the checks be performed for the mobile print server to determine that the personal computing resource is available. Alternatively, in another embodiment, all of the checks may be performed to determine if the personal computing resource is available.

At step 306 if the personal computing resource is not available, the method 300 may proceed to step 316. At step 316, the method 300 performs print conversion at the mobile print server. The method 300 may then proceed to step 314.

However, at step 306 if the personal computing resource is available, the method 300 may proceed to step 308. At step 308, the method 300 may determine whether the print job request should be sent to the personal computing resource.

In one embodiment, the determination may be made based upon distance. For example, the mobile print server can check the GPS location information of the personal computing resource provided during the registration process of the personal computing device, as described above with respect to the method 200, to determine if the personal computing resource is in closer proximity to a printer (either selected by the user that is included in the print job request or a printer selected by the mobile print server) than the mobile print server. If more than one personal computing resource was registered, then the mobile print server may determine which one of the registered personal computing resources are closest to the printing device and/or the mobile endpoint device.

In one embodiment, the determination may be made based upon an estimated wait time to finish processing a current print queue of the mobile print server versus the estimated time for the print job request to be sent to the personal computing resource and have the personal computing resource process the print job request (e.g., conversion of the document and routing to the printer). For example, although the mobile print server may be closer to the printer than the personal computing resource, there may be a large volume of print job requests being sent to the mobile print servers. As a result, the print queues of the mobile print servers may have a long wait time. Thus, the mobile print server may determine that sending the print job request to the personal computing resource for processing may be faster than waiting for an available mobile print server.

In another embodiment, the mobile print servers may be unavailable due to scheduled maintenance, low availability of network bandwidth for the mobile print servers or malfunction for conversion and routing. As a result, the mobile print servers may re-direct the print job requests to the personal computing resource. It should be noted that only a few examples are provided for various reasons for determining that the print job request should be sent to the personal computing resource. However, it should be noted that other scenarios or examples to improve efficiency and availability for processing of print job requests from mobile endpoint devices may be within the scope of the present disclosure.

At step 308, if the print job request should not be sent to the personal computing resource, the method 300 may proceed to step 316. At step 316, the method 300 performs print conversion at the mobile print server. The method 300 may then proceed to step 314.

However, at step 308 if the method 300 determines that the print job request should be sent to the personal computing resource, the method 300 may proceed to optional step 310. At optional step 310, the method 300 may determine if the personal computing resource has a copy of the document in the print job request. For example, the user may be trying to print a copy of a word processing document from his or her mobile endpoint device. However, the user may have a copy of the document on his or her desktop computer in the office.

At optional step 310, if the personal computing resource does not have a copy of the document in the print job request, the method 300 may proceed to step 318. At step 318, the mobile print server may send a copy of the document to the personal computing resource. For example, the document may be sent with the print job request from the mobile endpoint device. Said another way, the mobile print server may forward the document in the print job request to the personal computing resource.

However, at optional step 310, if the personal computing resource does have a copy of the document in the print job request, the method 300 may proceed to step 312. In other words, a copy of the document does not need to be forwarded to the personal computing resource. As a result, bandwidth may be saved in the communications network and processing times may be improved as less time is required to send and process the print job request.

At step 312, the method 300 sends the print job request to the personal computing resource for conversion. For example, the print job request may be sent with or without a copy of the document to be printed based upon whether or not the personal computing resource has a copy of the document.

In one embodiment, the personal computing resource performs the conversion. In other words, the document to be printed in the print job request is converted into a proper format (e.g., alignment, border width, font and font size, spacing, color, paper size, and the like) for printing.

At step 314, the method 300 sends the document to a spooler of the selected printer for printing. In other words, the personal computing resource routes the document that is converted to the selected printer and the document is printed. The method 300 may proceed to step 314 from either step 316 or 312.

In one embodiment, the personal computing resource may also send information or data associated with the processing of the print job request to the mobile print servers for auditing or reporting. For example, the data may include processing time, the data and time of the conversion and printing, a number of job requests processed by the personal computing resource, and the like.

In one embodiment, the decision to print to route the print job request to either the mobile print server or to the personal computing resource may be transparent to the user. That is, the user may not necessarily be informed after the print job request is submitted that the print job request has been routed to the personal computing resource. In other words, the user may submit the print job request from his or her mobile endpoint device and simply go to the printing device to obtain the print out without knowing whether the print job request was routed via the mobile print server or the personal computing resource. In another embodiment, the user may be sent a notification (e.g., an email or text message, or a push notification) indicating how the print job request was routed. The method ends at step 320.

It should be noted that although not explicitly specified, one or more steps, functions, or operations of the methods 200 and 300 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIGS. 2 and 3 that recite a determining operation, or involve a decision, do not necessarily require that both branches of the determining operation be practiced. In other words, one of the branches of the determining operation can be deemed as an optional step.

Figure 4:
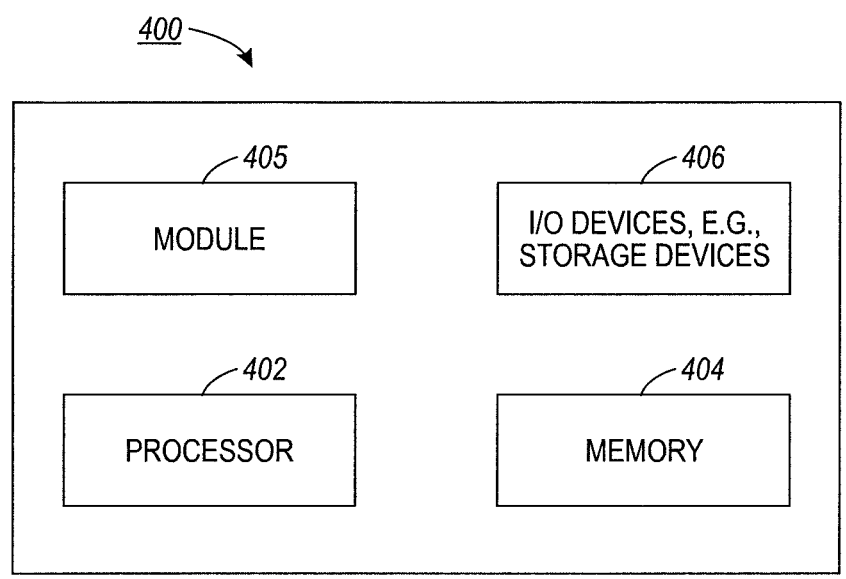
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for mobile print conversion and routing, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed methods. In one embodiment, the present module or process 405 for mobile print conversion and routing can be loaded into memory 404 and executed by processor 402 to implement the functions as discussed above. As such, the present method 405 for mobile print conversion and routing (including associated data structures) of the present disclosure can be stored on a non-transitory (e.g., physical and tangible) computer readable storage medium, e.g., RAM memory, magnetic or optical drive or diskette and the like. For example, the hardware processor 402 can be programmed or configured with instructions (e.g., computer readable instructions) to perform the steps, functions, or operations of methods 200 and 300.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for using a personal computing resource for mobile print conversion and routing, comprising:
registering, by a mobile print server, the personal computing resource with the mobile print server before a print job request is received, wherein the registering comprises:
receiving data associated with the personal computing resource, wherein the data comprises a machine name, a time period for operation, an address and a global positioning system (GPS) location information; and
sending a registration identification to the personal computing resource and a link to a software client to install on the personal computing resource, wherein the software client configures the personal computing resource to establish a communication path with the mobile print server;
receiving by the mobile print server the print job request from a mobile endpoint device before the print job request is sent to a printer;
determining by the mobile print server that the personal computing resource is idle to convert the print job request, wherein the personal computing resource is on at least one of: a desktop computer, a tablet computer, a laptop computer, a netbook computer or an ultra book computer that is a user owned personal computer resource or an office assigned personal computer resource of a user of the mobile endpoint device;
determining by the mobile print server to send the print job request to the personal computing resource;

sending by the mobile print server the print job request to the personal computing resource for conversion of a document in the print job request that is to be printed; and sending the document that is converted to a spooler of a selected printer to be printed.

2. The method of claim 1, wherein the registering further comprises:

scanning the personal computing resource to determine one or more file types that are compatible for printing on the personal computing resource.

3. The method of claim 1, wherein the determining at the mobile print server that the personal computing resource is idle comprises:

determining that the personal computing resource is on and capable of communicating with the mobile print server.

4. The method of claim 1, wherein the determining at the mobile print server that the personal computing resource is idle comprises:

determining that the personal computing resource is compatible with a file type of the document in the print job request.

5. The method of claim 1, wherein the determining at the mobile print server to send the print job request to the personal computing resource comprises:

determining that the personal computing resource is located at a location that is closer to the mobile endpoint device than a location of the mobile print server.

6. The method of claim 1, wherein the determining at the mobile print server to send the print job request to the personal computing resource comprises:

determining that a wait time for the mobile print server to finish processing a print job request queue would be longer than an amount of time required to send the print job request to the personal computing resource and have the personal computing resource process the print job request.

7. The method of claim 1, wherein the determining at the mobile print server to send the print job request to the personal computing resource comprises:

determining that the personal computing resource does not have a copy of the document in the print job request.

8. A non-transitory computer-readable medium storing a plurality of instructions, which when executed by a processor, cause the processor to perform operations for using a personal computing resource for mobile print conversion and routing, the operations comprising:

registering the personal computing resource with a mobile print server before a print job request is received, wherein the registering comprises:

receiving data associated with the personal computing resource, wherein the data comprises a machine name, a time period for operation, an address and a global positioning system (GPS) location information; and sending a registration identification to the personal computing resource and a link to a software client to install on the personal computing resource, wherein the software client configures the personal computing resource to establish a communication path with the mobile print server;

receiving the print job request from a mobile endpoint device before the print job request is sent to a printer;

determining that the personal computing resource is idle to convert the print job request, wherein the personal computing resource is on at least one of: a desktop computer, a tablet computer, a laptop computer, a netbook computer or an ultra book computer that is a user owned personal computer resource or an office assigned personal computer resource of a user of the mobile endpoint device;

determining to send the print job request to the personal computing resource;

sending the print job request to the personal computing resource for conversion of a document in the print job request that is to be printed; and sending the document that is converted to a spooler of a selected printer to be printed.

9. The non-transitory computer-readable medium of claim 8, wherein the registering further comprises:

scanning the personal computing resource to determine one or more file types that are compatible for printing on the personal computing resource.

10. The non-transitory computer-readable medium of claim 8, wherein the determining that the personal computing resource is idle comprises:

determining that the personal computing resource is on and capable of communicating with the mobile print server.

11. The non-transitory computer-readable medium of claim 8, wherein the determining that the personal computing resource is idle comprises:

determining that the personal computing resource is compatible with a file type of the document in the print job request.

12. The non-transitory computer-readable medium of claim 8, wherein the determining to send the print job request to the personal computing resource comprises:

determining that the personal computing resource is located at a location that is closer to the mobile endpoint device than a location of the mobile print server.

13. The non-transitory computer-readable medium of claim 8, wherein the determining to send the print job request to the personal computing resource comprises:

determining that a wait time for the mobile print server to finish processing a print job request queue would be longer than an amount of time required to send the print job request to the personal computing resource and have the personal computing resource process the print job request.

14. The non-transitory computer-readable medium of claim 8, wherein the determining to send the print job request to the personal computing resource comprises:

determining that the personal computing resource does not have a copy of the document in the print job request.

15. A method for mobile print conversion and routing, comprising:

registering by a mobile print server one or more personal computing resources, wherein the one or more personal computing resources are on at least one of: a desktop computer, a tablet computer, a laptop computer, a netbook computer or an ultra book computer that is a user owned personal computer resource or an office assigned personal computer resource of a user of the mobile endpoint device that is requesting a print job request, wherein registering each one of the one or more personal computing resources comprises:

receiving a machine name, a time period for operation, an address and a global positioning system (GPS) location information;

sending each one of the one or more personal computing resources a software client to install on the each one of the one or more personal computing resources, wherein the software client configures the personal computing resource to establish a communication path with the mobile print server; and scanning each one of the one or more personal computing resources to determine one or more file types that are capable of being printed on the each one of the one or more personal computing resources;

receiving by the mobile print server the print job request from the mobile endpoint device before the print job request is sent to a printer;

identifying by the mobile print server that the one or more personal computing resources are registered and that one of the one or more personal computing resources that is on, is idle, communicating with the mobile print server and a file type of a document in the print job request matches the one or more file types that are capable of being printed on the one of the one or more personal computing resources;

determining by the mobile print server that the print job request is to be sent to the one of the one or more personal computing resources based upon a wait time for the mobile print server to finish processing a print job request queue and a location of the mobile print server; and sending by the mobile print server the print job request to the one of the one or more personal computing resources for conversion of the document in the print job request that is to be printed.

* * * * *